(12) United States Patent
Aratani et al.

(10) Patent No.: US 8,204,362 B2
(45) Date of Patent: Jun. 19, 2012

(54) VIDEO RECORDING AND REPRODUCING APPARATUS, AND CONTROL METHOD

(75) Inventors: Shuntaro Aratani, Machida (JP); Tasuku Uchimi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1117 days.

(21) Appl. No.: 12/021,933

(22) Filed: Jan. 29, 2008

(65) Prior Publication Data

US 2008/0181581 A1  Jul. 31, 2008

(30) Foreign Application Priority Data

Jan. 31, 2007  (JP) .................................. 2007-021421

(51) Int. Cl.
*H04N 9/80* (2006.01)
(52) U.S. Cl. ......................... 386/248; 386/232; 386/353
(58) Field of Classification Search ...................... 386/46
See application file for complete search history.

(56) References Cited

U.S. PATENT DOCUMENTS

| | | | | |
|---|---|---|---|---|
| 5,412,481 A | * | 5/1995 | Ko et al. | 386/273 |
| 5,845,039 A | * | 12/1998 | Ko et al. | 386/275 |
| 6,385,386 B1 | * | 5/2002 | Aotake | 386/235 |
| 7,787,741 B2 | * | 8/2010 | Greenwood | 386/232 |
| 2003/0198458 A1 | * | 10/2003 | Greenwood | 386/46 |
| 2004/0085480 A1 | * | 5/2004 | Salzer et al. | 348/584 |
| 2004/0189867 A1 | * | 9/2004 | Pelagotti et al. | 348/459 |
| 2005/0254796 A1 | * | 11/2005 | Tomita | 386/125 |
| 2007/0220049 A1 | * | 9/2007 | Hwang | 707/104.1 |

FOREIGN PATENT DOCUMENTS

| | | |
|---|---|---|
| JP | 2004-246526 A | 9/2004 |
| JP | 2006-033231 A | 2/2006 |

* cited by examiner

*Primary Examiner* — Oscar Louie
(74) *Attorney, Agent, or Firm* — Canon USA, Inc., IP Division

(57) ABSTRACT

An apparatus configured to acquire video content data and record the data in a storage unit and play back video based on the video content data includes: an upconverting processing unit configured to perform upconverting of the video content data recorded in the storage unit; an estimation unit configured to estimate a time period required for the upconverting of the video content data; an acquisition unit configured to acquire viewing deadline information that indicates a viewing deadline of the video content data and to acquire playback time period information that indicates a time period required to play back the video content data; and a control unit configured to determine whether the upconverting of the video content data is to be performed based on the time period estimated by the estimation unit, the viewing deadline information, and the playback time period. A related method is also disclosed.

10 Claims, 9 Drawing Sheets

FIG.4

| HDD STORAGE ID | CONTENT TITLE | CONTENT CATEGORY | CONTENT PLAYBACK TIME | CONTENT RESOLUTION | CONTENT FPS | UPCONVERTED CONTENT STORAGE ID | VIEWING DEADLINE |
|---|---|---|---|---|---|---|---|
| 000001 | AAA | MOVIE | 125 min | 1920×1080 | 60 | ap00001 | 20060531,0:00 |
| 000002 | BBB | DRAMA | 60 min | 1920×1080 | 60 |  | 20060609,12:00 |
| 000003 | CCC | DOCUMENTARY | 80 min | 1920×1080 | 60 | ap00002 | 20060620,0:00 |
| 000004 | DDD | SPORTS | 150 min | 1920×1080 | 60 |  | 20060604,16:00 |
| 000005 | EEE | MOVIE | 130 min | 1920×1080 | 60 |  | 20060601,0:00 |
| 000006 | FFF | MOVIE | 120 min | 1920×1080 | 60 |  | 20060530,00:00 |

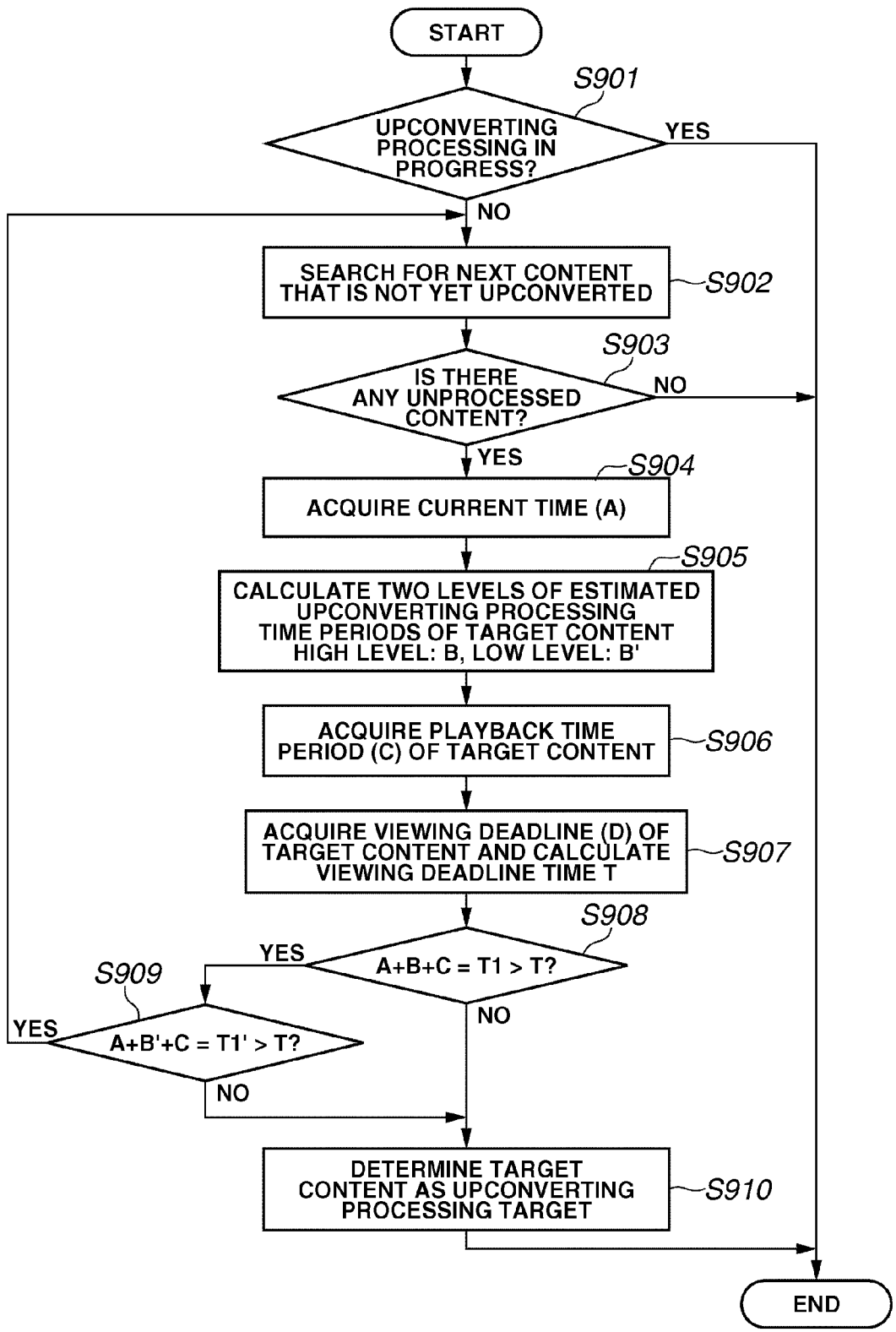

VIDEO RECORDING AND REPRODUCING APPARATUS, AND CONTROL METHOD

BACKGROUND OF THE INVENTION

1. Field of the Invention

The present invention relates to a video recording and reproducing apparatus and a control method of the video recording and reproducing apparatus. More particularly, the present invention relates to a video recording and reproducing apparatus configured to temporarily record video content data in a storage unit and to perform upconverting to provide high-quality image and sound in playback of the recorded video content data and a control method of the video recording and reproducing apparatus.

2. Description of the Related Art

In recent years, server-type broadcasting systems have come into practical use. In a server-type broadcasting system, a video recording and reproducing apparatus stores and utilizes video content data that is transmitted from a server apparatus via a digital broadcast wave or a broadband network.

In the server-type broadcasting systems, viewers can view a desired program content by obtaining a license from a content provider.

Similarly, video on demand (VOD) services by which a viewer can watch content such as a movie at any desired time has come into common use. In a VOD service, similar to the server-type broadcasting system, license-managed video content data is delivered from a content provider to a Set Top Box (STB) for the VOD service use. The viewer can watch the video content data delivered to the STB by displaying the data on a display device such as a television (TV). Until recently, in a conventional VOD service, the viewer could not store the video content data in a storage device such as a hard disk drive (HDD). However, recently, there are VOD services in which the STB includes a hard disk drive (HDD) so that license-managed video content data can be temporarily stored.

Generally, a viewing deadline is set to the license-managed contents, so that a viewer cannot watch the contents after the designated viewing deadline passes.

However, for example, Japanese Patent Application Laid-Open No. 2006-33231 discusses a method that can prevent a case where the viewing deadline expires while the viewer is still watching the content so that the viewer can no longer continue watching the content. In the control method discussed in Japanese Patent Application Laid-Open No. 2006-33231, it is detected whether remaining time up to a viewing deadline of moving image content is shorter than time necessary for playing back the moving image content. If the remaining time is shorter than the time necessary for playback of the moving image content, a playback speed which enables the viewer to watch the content to the end is calculated and multispeed playback can be performed.

Until recently, a maximum number of effective pixels of video broadcasted in a digital broadcasting service is a high definition (HD) format of 1920×1080. However, with a recent significant advance in display panel technology, resolutions of display devices have improved to a Super High Definition (SHD) format of 4000×2000.

A technology in which content in standard definition (SD) format or the HD format received from a broadcast service or a VOD service are converted into higher quality resolutions and sounds (hereinafter, referred to as upconvert) by a high-performance computing device have also recently been developed. For example, Japanese Patent Application Laid-Open No. 2004-246526 discusses an upconverting technology in which each pixel in video is analyzed whether any regular lines of contrast difference exist between the pixel and surrounding pixels. Based on the regularity, a numerical expression representing an image in a real world that has caused the contrast difference can be estimated. Based on the numerical expression, a high-resolution image can be obtained. However, the above described upconverting technology includes a very complicated algorithm which is computationally intensive.

Generally, the above described upconverting technology utilizing the complicated algorithm can assure a higher image quality as compared with simple resolution conversion. However, the upconverting requires a longer processing time period than the actual time that the video content takes to be displayed. Accordingly, it is difficult to perform playing back of stored video and a high-quality image processing at the same time.

Concerning the above-described technologies, systems have been proposed that can automatically upconvert video content at the SD or HD level stored in a storage device into video data of the SHD level.

In such system, it is important to provide upconverted video contents as much as possible at a timing when a viewer desires to watch a high image quality video content. Accordingly, generally, all stored video contents are upconverted.

However, when video content having a viewing deadline stored in a video recording and reproducing apparatus, that corresponds to the above-described server type broadcasting systems or the VOD services, is upconverted (even if a high-performance computing processing device is used), the following problems may occur.

As described above, viewing deadlines are usually set to video contents which can be watched in the above-described services. Accordingly, when the upconverting is performed on the video content that takes long time, the viewing deadlines can expire before the upconverting is completed. Moreover, even if the upconverting is completed by the viewing deadlines, after the completion of the upconverting process, there may not be enough time remaining before the deadline to watch the upconverted content. Thus, the execution of the upconverting process itself can be a problem.

Moreover, if the upconverting process is performed on video content that does not require the upconverting process, a problem may arise that an insufficient processing time period is provided for other video content that needs to be upconverted.

SUMMARY OF THE INVENTION

The present invention is directed to a video recording and reproducing apparatus capable of selecting video content which is to be upconverted and avoiding an inconvenience that a viewing deadline of video content expires before completion of upconverting or right after the completion of the upconverting. The present invention is also directed to a control method of such a video recording and reproducing apparatus.

According to an aspect of the present invention, a video recording and reproducing apparatus is configured to acquire video content data and record the data in a storage unit and to play back video based on the video content data recorded in the storage unit, the video recording and reproducing apparatus includes: an upconverting processing unit configured to perform upconverting of the video content data recorded in the storage unit; an estimation unit configured to estimate a time period required for the upconverting of the video content data; an acquisition unit configured to acquire viewing deadline information that indicates a viewing deadline of the video content data and to acquire playback time period information that indicates a time period required to play back the video content data; and a control unit configured to determine whether the upconverting of the video content data is to be performed based on the time period estimated by the estimation unit, the viewing deadline information, and the playback time period.

According to another aspect of the present invention, a method of controlling a video recording and reproducing apparatus capable of acquiring video content data and recording the data in a storage unit includes: performing upconverting on video content data recorded in a storage unit; estimating a time period required for the upconverting of the video content data; acquiring viewing deadline information that indicates a viewing deadline of the video content data; acquiring playback time period information that indicates a time period required to play back the video content data; and determining whether the upconverting of the video content data is to be performed based on the estimated time period, the viewing deadline information, and the playback time period. Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a view illustrating information about stored content and viewing deadline of the content in association with each other according to the first exemplary embodiment of the present invention.

FIG. 9 is a flowchart illustrating an operation according to a third exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

A video recording and reproducing apparatus according to a first exemplary embodiment, in determining video content to be upconverted, adds an estimated finishing time of the upconverting and content playback time period. The resulting sum is compared to a viewing deadline information of the content. If, according to the estimate, enough time remains before the viewing deadline to both upconvert video content and watch the upconverted content, the video recording and reproducing apparatus upconverts the video content.

For example, image correction processing, sound quality correction processing, or the like provided in digital televisions and digital recorders without upconverting is performed within a period before the broadcast-received video content data is displayed on a display unit. For example, in resolution conversion processing or color conversion processing, without upconverting, the data can be displayed on the display unit while the resolution conversion or color conversion is performed on frame data of the video being played back. The video content data can be processed in real time within the actual time of the video content where upconverting is not used.

On the contrary, in a case of the upconverting, by utilizing analysis of the video content data or various arithmetical operation, the image or the sound in the video content is converted into a high quality image or a high quality sound which requires more time than actual time of the video content. In the exemplary embodiments, the upconverting refers to the conversion of images or sounds into high quality images or high quality sounds that is not processed in real time.

Figure 1:
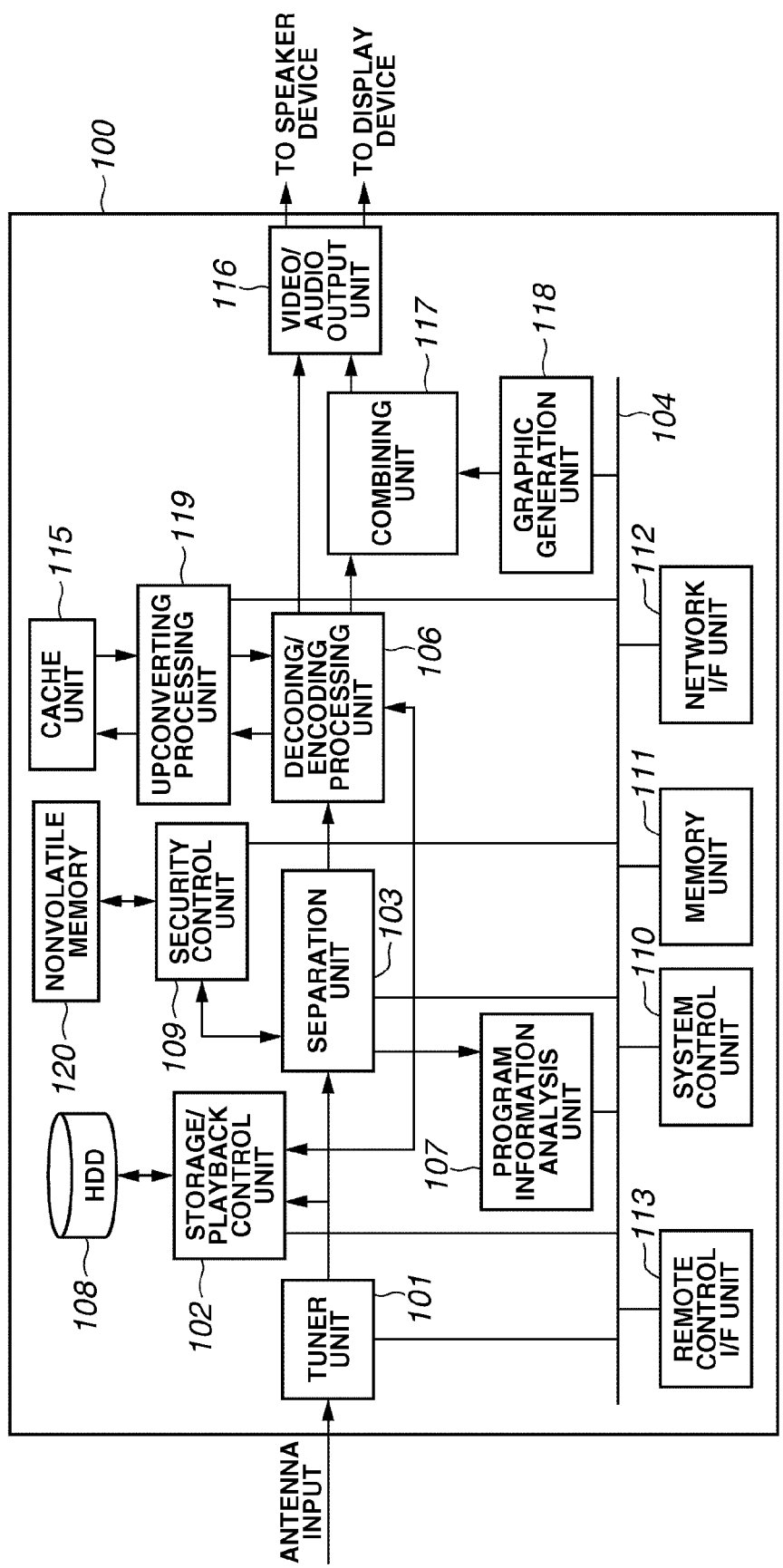
FIG. 1 is a block diagram illustrating an exemplary configuration of a video recording and reproducing apparatus according to a first exemplary embodiment of the present invention.

FIG. 1 is a block diagram illustrating an exemplary configuration of a video recording and reproducing apparatus 100 according to the first exemplary embodiment of the present invention. The video recording and reproducing apparatus 100 includes, for example, a HDD recorder that can record and reproduce video content data. The video recording and reproducing apparatus 100 is compliant with server type broadcasting systems. The video recording and reproducing apparatus 100 can receive a digital broadcasting wave transmitted from a broadcast station or other content provider. Moreover, the video recording and reproducing apparatus 100 is capable of directly or indirectly communicating with broadcast stations via a network such as the Internet.

In the first exemplary embodiment, the video recording and reproducing apparatus used in server type broadcasting systems are described. However, the exemplary embodiment of the present invention can also be applied to other services or systems, such as the VOD services.

In FIG. 1, via an antenna or a broadband modem (not illustrated), a broadcast signal from a terrestrial digital broadcast, a satellite digital broadcast, a broadband, or the like is received. The received broadcast signal is input in a tuner unit 101. The tuner unit 101 performs decoding, error correction, or the like on the input broadcast signal, and generates digital data in a transport stream data (TS data) format. Various streams or data are multiplexed in the transport stream data format, which is described below.

A storage and playback control unit 102 performs processing to record the TS data in a HDD 108 that functions as a storage unit in response to a recording instruction from a system control unit 110. Further, in response to a playback instruction from the system control unit 110, the storage and playback control unit 102 reads out the TS data from the HDD 108 and outputs the data to a separation unit 103.

The separation unit 103 separates a video stream and an audio stream from the TS data output from the tuner unit 101 or the storage and playback control unit 102. The separation unit 103 also separates service information (SI) including program information, data broadcasting data, program specific Information (PSI) including component information that forms a content, license data, or the like, from the TS data. Further, the separation unit 103 has a function of decrypting TS data scrambled by a cipher using an encryption key provided from a security control unit 109.

Then, the output of the separation unit 103 is supplied to a decoding/encoding processing unit 106, and MPEG decoding-process to generate video and audio information that can be played back is performed.

The video information decoded by the decoding/encoding processing unit 106 is combined with graphic information generated in a graphic generation unit 118 by a combining unit 117. The combined video information is transmitted to a display device (not illustrated) via a video/audio output unit 116. The audio information processed by the decoding/encoding processing unit 106 is transmitted to a speaker device (not illustrated) via the video/audio output unit 116.

A program information analysis unit 107 extracts from the PSI/SI information separated by the separation unit 103 detailed information (program title, content playback time period, video format, resolution, and information about a program content that forms components) of the video content contained in the stored TS data. The extracted information is stored as "stored content information" in a memory unit 111 by the system control unit 110. The program information analysis unit 107 also extracts program information for forming electronic program guide (EPG) that is contained in the stored TS data, and stores the extracted information in the memory unit 111 via the system control unit 110.

The license data separated by the separation unit 103 is supplied to the security control unit 109 and stored in a nonvolatile memory 120 connected to the security control unit 109. The license data contains encryption key information about a viewing deadline or a cipher of the content.

The security control unit 109 analyses the license of the video content that a viewer instructs to play back and determines whether the viewer can be allowed to watch the content which he instructs to play back. The security control unit 109 also extracts a key for releasing a cipher from the license data and transmits it to the separation unit 103. The security control unit 109 communicates with a server of a broadcast station or a content provider via a network interface 112.

The system control unit 110, while controlling each of the above-described functional modules, controls reception, recording, playback, graphic, and upconverting for the whole system based on the viewer's instruction input via a remote control interface unit 113. The above-described main functional units are connected with each other via an internal bus 104.

Next, the upconverting to the stored video content data performed by the video recording and reproducing apparatus 100 is described with reference to FIG. 1.

The system control unit 110 controls the upconverting so that HD video content stored in the HDD 108 becomes video content of the SHD level. The upconverting is performed while there is no recording request or playback request from viewers and the apparatus is not in operation. The system control unit 110 issues an instruction to read out the HD content data (TS data) to the storage playback control unit 102. The TS data read out from the HDD 108 is separated into a video/audio stream and the data such as the PSI/SI data, by the separation unit 103, and the separated data is transmitted to the decoding/encoding unit 106. The video data and audio data that is MPEG decoding-processed by the decoding/encoding unit 106 is output to an upconverting processing unit 119.

A cache unit 115 stores frame data being processed by the upconverting processing unit 119. The video image upconverted to a SHD resolution by the upconverting processing unit 119 is input to the decoding/encoding processing unit 106 again, and the SHD resolution image is encoded by the upconverting processing unit 119 into a JPEG 2000 format. The encoded video content is transmitted to the storage and playback control unit 102 and stored in the HDD 108.

The information about the upconverted video content is managed by the system control unit 110. The system control unit 110 associates the information about the HD level video component that is to be upconverted with the information about the SHD level video component generated as a result of the upconverting. The system control unit also stores the associated information in the memory unit 111.

In the above description, MPEG-2 is used as the video encoding format for the original data that is to be upconverted. However, the encoding format is not limited to MPEG-2. Any other video coding format, H.264/AVC for example, can also be used. Moreover, in the above description, JPEG2000 is used as the encoding format for the upconverted data. However, any other coding format can also be used for the upconverted data.

Next, an embodiment of a process of determining an upconverting content that is performed by the system control unit 110 with support from the remainder of the video recording and reproducing apparatus 100 is described with reference to the flowchart in FIG. 2.

In step S201, the system control unit 110 checks whether upconverting is currently being performed by the upconverting processing unit 119. If the upconverting is currently being performed (YES in step S201), the processing of FIG. 2 is terminated. If the upconverting is not currently being performed (NO in step S201), the processing proceeds to step S202. In step S202, the system control unit 110 refers to "stored content information" stored in the memory unit 111 and searches for a content that is not yet upconverted.

In step S203, the system control unit 110 checks whether there is unprocessed video content data. If unprocessed video content data does not exist (NO in step S203), the processing of FIG. 2 is terminated. On the other hand, if unprocessed video content data exists (YES in step S203), the processing proceeds to step S204. In step S204, the system control unit 110 acquires current time information A. The current time information indicates the current time (which includes both a date and a time within that date). In step S205, the system control unit 110 calculates estimated processing time period B required for upconverting of the unprocessed video content data (target content) that has been found.

The estimated processing time period required for the upconverting performed in step S205 is given as follows:

Estimated upconverting processing time period $B$=(estimated average processing time period per one pixel $t$)×(the number of pixels in one frame of original image $N$)×(the number of frames $f$)

wherein, "estimated average processing time period per one pixel t" contains a value obtained from time period information of upconverting performed in the past by the video recording and reproducing apparatus 100. The system control unit 110 calculates the estimated upconverting processing time period based on the "estimated average processing time period per one pixel t", the number of pixels in one frame of target content N, and the number of frames f. The estimated time may be calculated using other methods than the above expression.

In step S206, the system control unit 110 acquires playback time period information C of the target content from the stored content information. The content playback time period is for a case where the content is played back at a normal speed.

In step S207, the system control unit 110 acquires viewing deadline information D of the target content from the nonvolatile memory 120 via the security control unit 109. If the viewing deadline information D is expressed in elapsed time from a predetermined timing, for example, "within 48 hours from content acquisition date and time", then, viewing deadline time T, which is described below, is calculated by adding the elapsed time to the predetermined timing. The viewing deadline time T indicates both a date and time within that date.

In step S208, the system control unit 110 determines whether time T1 obtained by adding estimated upconverting processing time period B and playback time period C of the target content to current time A, exceeds time T set as a viewing deadline. The system control unit 110 makes this determination to decide whether the upconverting of the target content is necessary.

If the obtained time T1 exceeds the viewing deadline time T (YES in step S208), the system control unit 110 determines not to perform the upconverting to the target content. Then, the processing returns to step S202, and the system control unit 110 searches for unprocessed video content data and performs another iteration of the above described processing as illustrated by the flow chart of FIG. 2. On the other hand, if the time T1 does not exceed the viewing deadline time T (NO in step S208), the processing proceeds to step S209. In step S209, the system control unit 110 determines the target content as an upconverting target, and the processing of FIG. 2 is terminated.

In FIG. 4, an example of the "stored content information" stored in the memory unit 111 is illustrated. The system control unit 110 stores a content title, content category, content playback time period, a content resolution, a content frame per second (FPS) analyzed by the program information analysis unit 107, in a table format. The system control unit 110 stores the above information together with ID information appended to the video content data stored in the HDD 108. Moreover, the system control unit 110 associates the upconverted video content data with an ID of the content. In FIG. 4, viewing deadline information of each video content that is managed by the security control unit 109 is also illustrated for convenience. The viewing deadline information managed by the security control unit 109 may be contained in the table of the stored content information.

An example of the first exemplary embodiment will be described below. It is assumed that current time A of video content which is to upconverted, is May 29, 2006, 14:00, a content ID in FIG. 4 is 000006, and the program title is FFF. The estimated upconverting time of the video content is calculated. As a result, if the estimated time B is 8 hours and 30 minutes and the content playback time period C of 120 minutes is added to the estimated time B, the calculated time T1 is May 30, 2006, 00:30. Accordingly, the time exceeds the viewing deadline time T of the video content May 30, 2006, 00:00. In such a case, the system control unit 110 does not consider the video content to be an upconverting target, and the system control unit 110 searches for another unprocessed video content.

Next, an operation flow of the system control unit 110 in a case where the video recording and reproducing apparatus 100 performs upconverting is described with reference to the flowchart in FIG. 3. In step S301, as a result of the flow described in FIG. 2, if the upconverting target content exists (YES In step S301), then the processing proceeds to step S302, whereas if the upconverting target content does not exist (NO in step S301), then the processing in FIG. 3 is terminated. In step S302, the system control unit 110 issues an instruction to read out the video content from the HDD 108 to the storage playback control unit 102.

In step S303, the system control unit 110 issues an instruction to perform the upconverting to the separation unit 103, the decoding/encoding unit 106, and the upconverting processing unit 119.

In response to completion of the upconverting, in step S304, the system control unit 110 calculates an estimated average processing time period per one pixel based on time required for the upconverting and the number of pixels in one frame of the processed video content. In step S305, the system control unit 110 calculates an average of the calculated estimated average processing time period in step S304 and the estimated average processing time period t stored in the memory, and stores the calculated average in the memory unit 111. This process is performed to increase accuracy of the "estimated average processing time period per pixel t" used to obtain the estimated time for the upconverting calculated in step S205 in FIG. 2.

In step S306, the system control unit 110 appends a storage ID to the upconverted video content. The system control unit 110 also registers the storage ID in the storage content information illustrated in FIG. 4. The processing of FIG. 3 is then terminated.

As described above, in the first exemplary embodiment, when the video content to be upconverted is determined, the estimated processing time period of the upconverting is calculated and the time obtained by adding the estimated processing time period, the current time, and the content playback time period together is also calculated. Then, the obtained time is compared with the viewing deadline information of the video content, and the video content for which there is estimated to be sufficient time to both upconvert and watch by the viewing deadline is determined as the upconverting target. Accordingly, the viewers can avoid an inconvenience that viewing deadline of the video content expires before completion of upconverting or right after the completion of the upconverting.

In the above-described exemplary embodiment, as the distribution system of the video content, the broadcast reception has been discussed. However, the distribution system of the video content is not limited to broadcast. The present invention can also be applied to the VOD services such as a video transfer using a network as long as format information of video content can be obtained. Similarly, other exemplary embodiments described below are not limited to the broadcast either.

Further, in the above-described exemplary embodiment, the time information T1 obtained by adding the estimated upconverting time and the content playback time period to the current time is compared with the viewing deadline time T. However, the viewers do not always watch video content right after upconverting of the video content is completed. Moreover, the estimated upconverting time may be different from actual time. In such cases, even if the upconverting is performed, the viewers may actually not be able to watch the upconverted video content.

Accordingly, in consideration of the watching conditions of the viewers and the difference between the estimated and actual upconverting time, it is possible to add a grace time period to time T1. For example, as a grace time period information S, a time period of 12 hours is set in advance, and time obtained by adding the grace time period information S to time T1 is used. As a result, it is possible to prevent a problem arising due to the difference of the estimated and actual upconverting time and due to the difference of the watching timing of the viewers. The grace time period information S can also be applied to the other exemplary embodiments described below.

Second Exemplary Embodiment

The video recording and reproducing apparatus 100 according to a second exemplary embodiment determines video content to be upconverted in a service field where updating of video contents is regularly performed. In determining the video content to be upconverted, information about an updating cycle or an updating schedule of the video content is checked in advance. If an estimated next updating time (estimated viewing deadline time) is close, the video content is eliminated from the upconverting target.

In several server type broadcasting systems, video content is regularly distributed and regularly or irregularly updated. For example, in a case of a video drama series, after a first episode of the series is distributed, a second episode of the series is distributed within one week, and then, the first episode is erased (over written) by the second episode. In such a case, the updating is performed regularly or irregularly based on control by the broadcasting station or the content providers but not based on viewer's operation.

A configuration of the video recording and reproducing apparatus according to the second exemplary embodiment is the same as (or alternatively similar to) that according to the first exemplary embodiment, therefore, its description is not repeated. The processing of the system control unit 110 that performs characteristic operation according to the second exemplary embodiment is described below.

Figure 5:
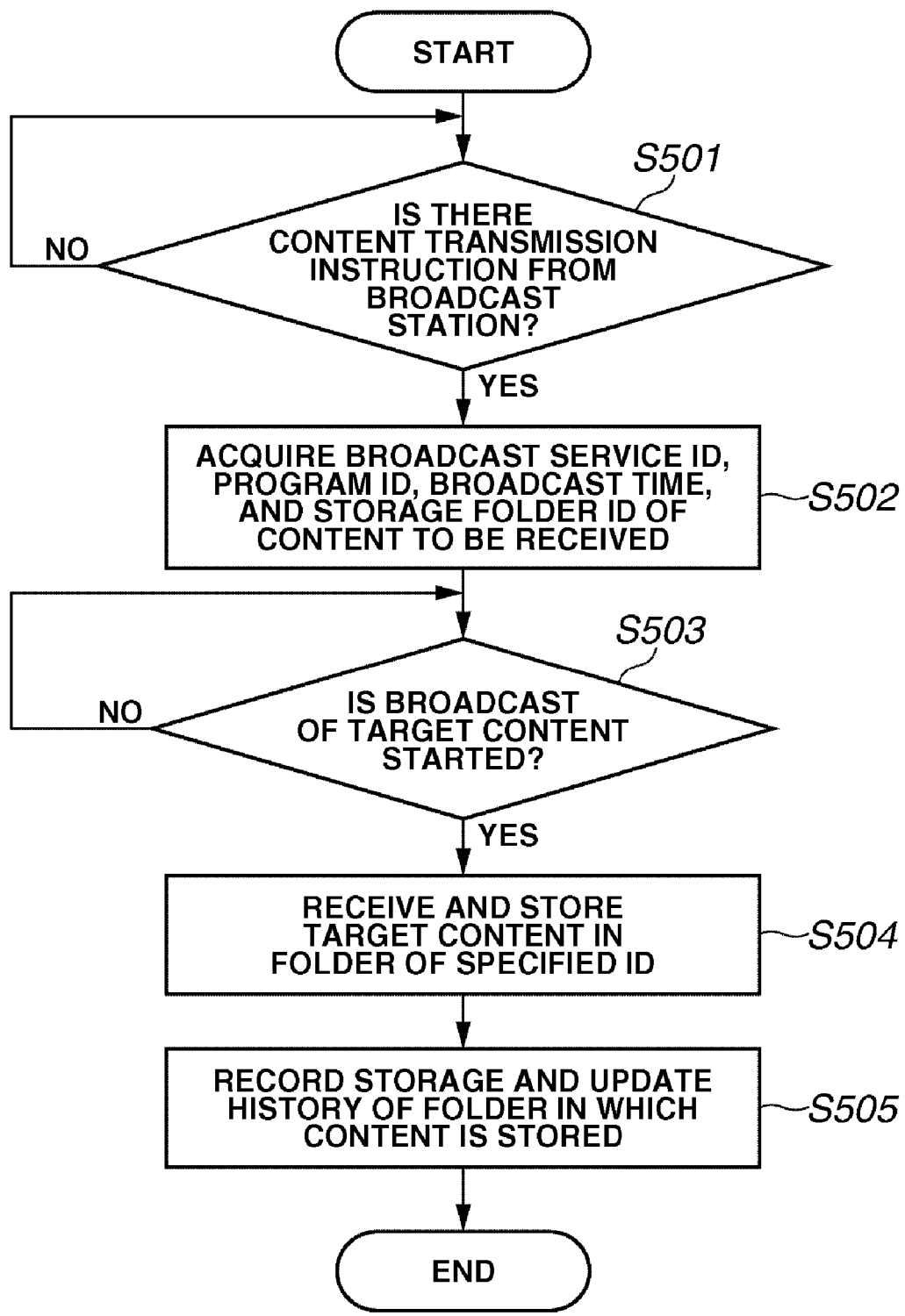
FIG. 5 is a flowchart illustrating operation according to a second exemplary embodiment of the present invention.

FIG. 5 is a flowchart illustrating storage control in video content storage operation performed by the system control unit 110 according to the second exemplary embodiment of the present invention.

In step S501, the system control unit 110 communicates with a server of a broadcast station via a network interface, and monitors a video content transmission notice which is transmitted from the broadcasting station. When the notice of the video content transmission is issued from the broadcast station (YES in step S501), the processing proceeds to step S502. In step S502, the system control unit 110 acquires a broadcasting service ID, a program ID, broadcasting time, and a storage folder ID of the video content which are received through communication with the server.

In step S503, the system control unit 110 checks whether broadcast of the noticed video content is started. If the noticed video content is broadcast via a broadcast wave (YES in step S503), the processing proceeds to step S504. In step S504, the system control unit 110 receives the content via the broadcast wave, and instructs the storage and playback control unit 102 to start storage of the video content. Then, the system control unit 110 generates a folder according to the storage folder ID specified by the server, and stores a stream (TS data) of the video content in the folder. The storage folder ID is uniquely appended to each video content by the broadcast station (or other content provider), and generally, a different ID is given to each episode of video content.

However, in some cases, the broadcast station regularly updates the content. In such a case, a same storage folder ID typically is used. When the video recording and reproducing apparatus 100 receives and stores a video content, a content of the folder corresponding to the ID is replaced with the new content.

Figure 6:
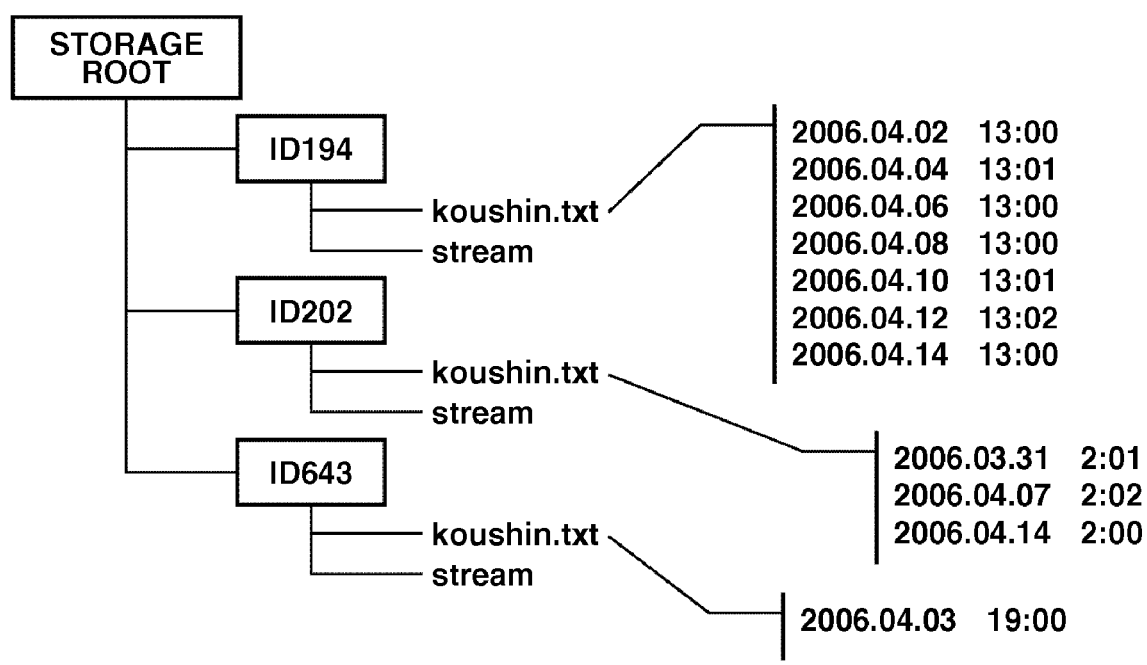
FIG. 6 is a schematic diagram illustrating an example of contents of a storage folder according to the second exemplary embodiment of the present invention.

In step S505, the system control unit 110 records information about date and time when the video content is stored and updated, as storage history information and updating history information, in each storage folder. FIG. 6 illustrates an example of the file contents stored in each storage folder. In the drawing, a file referred to as "stream" is video content data, and the updated date and time of the video content in the folder is recorded in "koushin.text". In the second exemplary embodiment, the information is used as folder update history.

Figure 7:
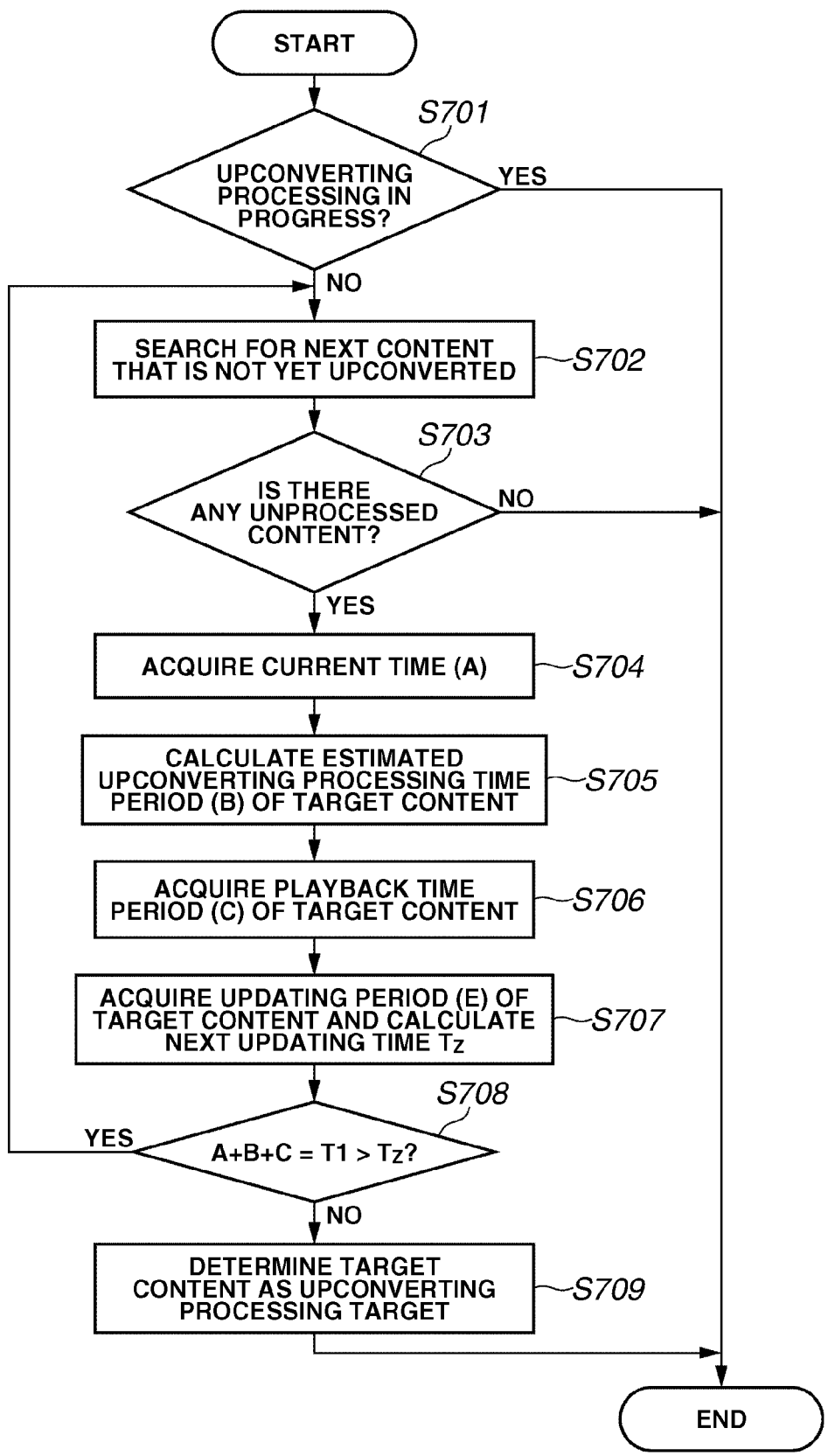
FIG. 7 is a flowchart illustrating operation according to the second exemplary embodiment of the present invention.

Next, another example of a process of determining a content to be upconverted that is performed by the system control unit 110 with support from the remainder of the video recording and reproducing apparatus 100 is described with reference to the flowchart in FIG. 7.

In step S701, the system control unit 110 checks whether upconverting is being performed by the upconverting processing unit 119. If the upconverting is currently being performed (YES in step S701), then the processing illustrated in FIG. 7 is terminated, however if the upconverting is not currently performed (NO in step S701), then the processing proceeds to step S702.

In step S702, the system control unit 110 refers to the storage content information stored in the memory unit 111, and searches for a video content that has not been upconverted.

Figure 2:
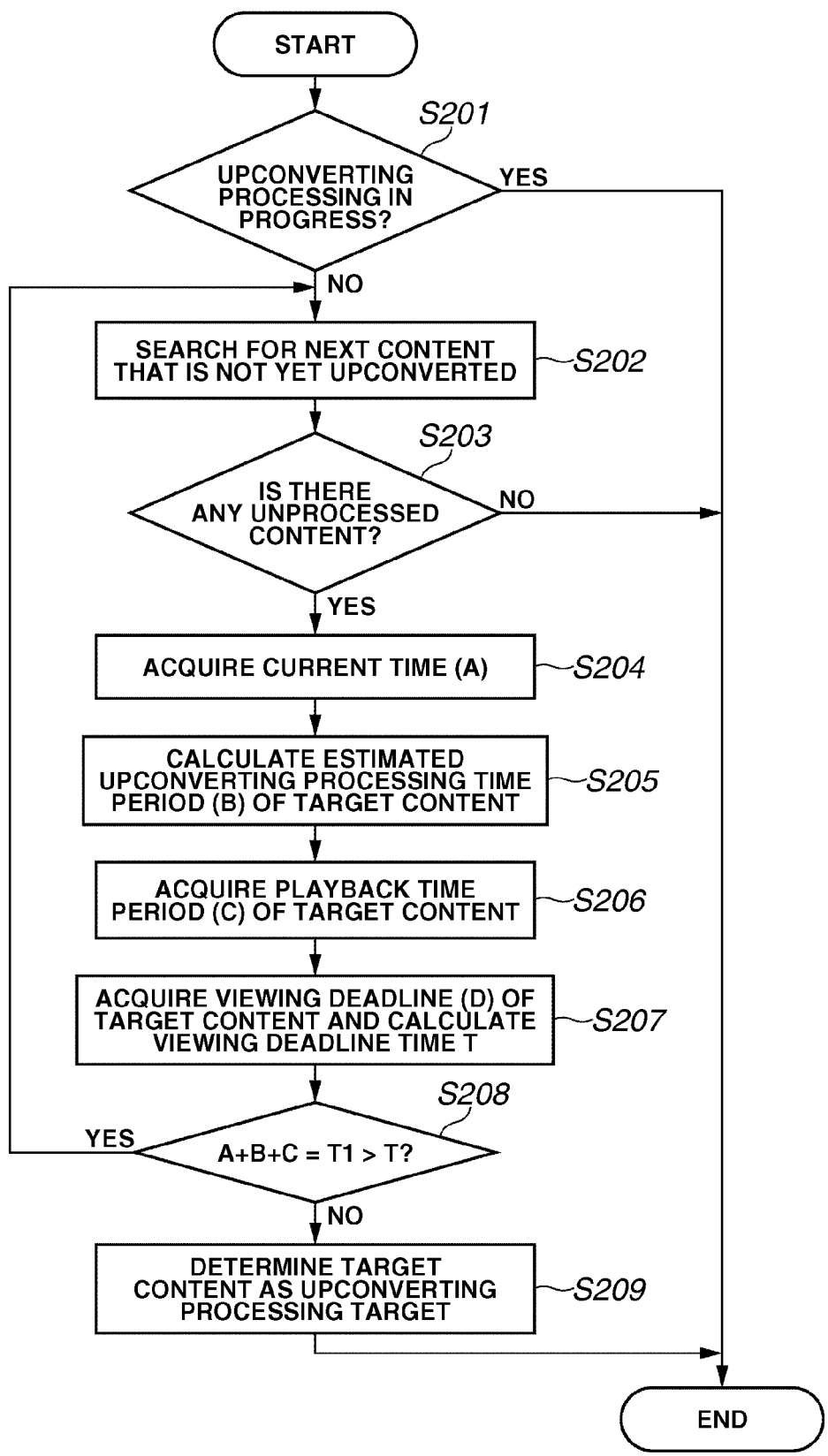
FIG. 2 is a flowchart illustrating operation according to the first exemplary embodiment of the present invention.
Figure 3:
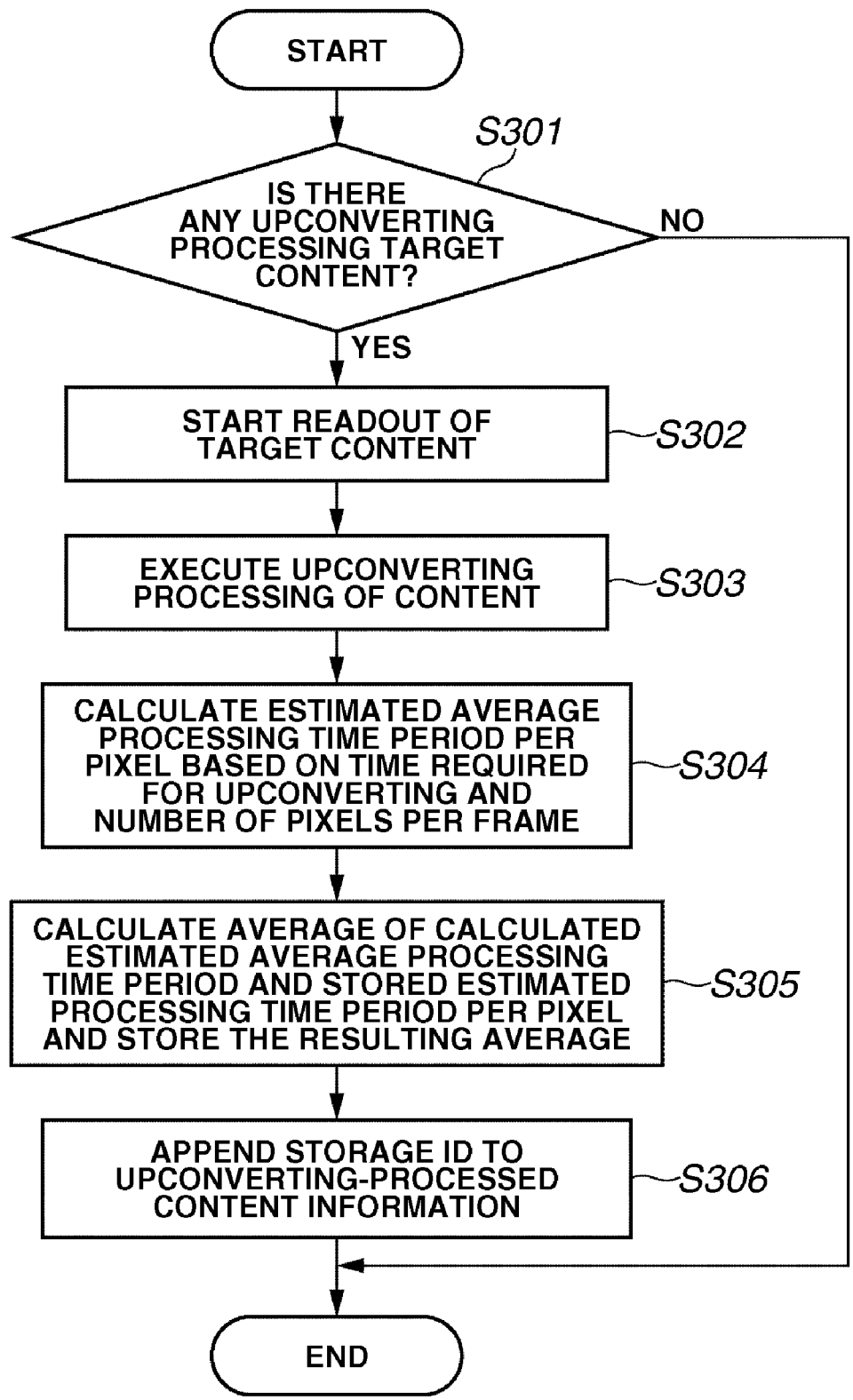
FIG. 3 is a flowchart illustrating operation according to the first exemplary embodiment of the present invention.

Processing of steps S703, S704, S705, and S706 are respectively performed in the same manner as (or alternatively a similar manner to) the processing of steps S203, S204, S205, and S206 of the first exemplary embodiment as illustrated in FIG. 2.

In step S707, the system control unit 110 reads out update history information of the folder in which the target content is stored and estimates a next updating time. This processing is performed, for example, by calculating a minimum period E of past updating intervals and estimating the next updating time. The second embodiment uses the estimated updating time information Tz as described below. If only one update history of folder exists in the information, (for example because no video content update has been previously performed), an estimated next updating date and time is defined as "unknown".

In the first exemplary embodiment, the viewing deadline is the information appended to the video content in advance. However, in the second exemplary embodiment, the estimated updating time is a viewing deadline of the video content, and the viewing deadline is uniquely obtained from the update history of the video content by the video recording and reproducing apparatus. Processing continues in step S708.

In step S708, the system control unit 110 determines whether time T1 obtained by adding current time A, estimated upconverting time B, and content playback time period C exceeds next estimated updating time Tz. The estimated updating time Tz indicates both a date and a time within that date. If the obtained time T1 exceeds the estimated updating time Tz (YES in step S708), the system control unit 110 determines not to perform the upconverting to the target content. Then, the processing returns to step S702, and the system control unit 110 searches for a next unprocessed video content and performs another iteration of the above described processing as illustrated by the flow chart of FIG. 7. On the other hand, if the time T1 does not exceed the estimated updating time Tz (NO in step S708), the processing proceeds to step S709. In step S709, the system control unit 110 determines the target content as an upconverting target content, and the processing illustrated in FIG. 7 is terminated. An instance of this processing is described below with reference to FIG. 8.

Figure 8:
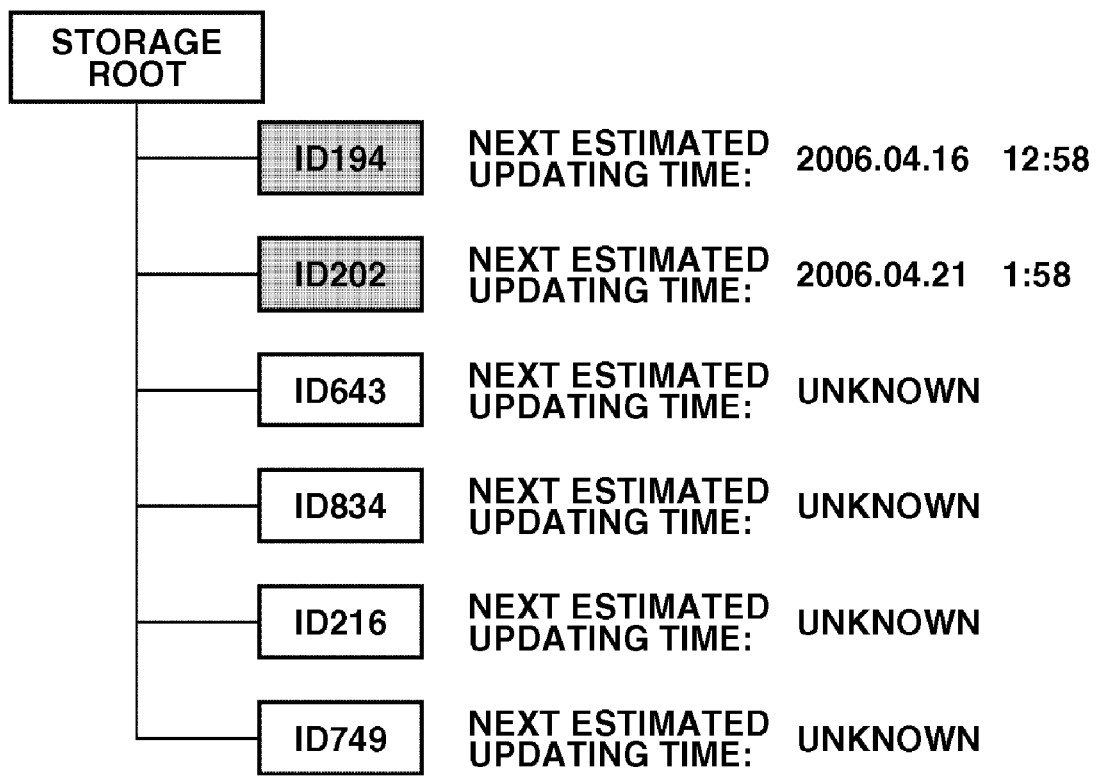
FIG. 8 is a view illustrating an example of storage folder IDs and next estimated updating time according to the second exemplary embodiment of the present invention.

FIG. 8 illustrates an example of a folder configuration in the HDD 108 in which a plurality of installments of video content and estimation results of next updating time of each folder are stored. For example, Suppose the current time A is Apr. 16, 2006, 05:00, then video content stored in a folder of ID194 is current. Suppose also that the playback time period C of the video content is 120 minutes, and the estimated upconverting time B is 8 hours. In such a case, the time T1 obtained by adding the above time (T1=A+B+C as described above) is Apr. 16, 2006, 15:00. In this example, a twenty-four hour clock is used; for example, 15:00 refers to 3:00 P.M. Moreover, next estimated updating time Tz of the video content stored in the folder of the ID194 is Apr. 16, 2006, 12:58. Accordingly, the time T1 exceeds the next estimated updating time Tz (an example of YES in step S708). Consequently, the system control unit 110 does not determine the video content to be the upconverting target and accordingly executes searching of another unprocessed video content (an example of step S702).

With respect to the folder update history according to the second exemplary embodiment, the files for recording updating date and time are stored in each folder in the file system illustrated in FIG. 6, and the contents of the files are used as the update history information. However, the folder IDs, the updating date and time, and the calculated estimated updating time alternatively can be associated with each other and stored in the memory unit 111 or the like as table format data.

In the second exemplary embodiment, the updating time is estimated by calculation. However, in a case where the updating date and time is specified by a broadcast station, the specified date and time can be used in place of the estimated updating time Tz. In such a case, the specified date and time is similar to the viewing deadline information appended to the video content in advance in the first exemplary embodiment.

As described above, in the second exemplary embodiment, when video content is upconverted, a processing time period of the upconverting is estimated. Then, the estimated processing time period of the upconverting, current time, and content playback time period are added. Then, the added time is compared with estimated updating time of the video content. Video content for which there is estimated to be sufficient time to both upconvert and play back by the expiration of an estimated (or alternatively specified) viewing deadline is determined to be an upconverting target. According to the operation, the viewers can avoid an inconvenience that a viewing deadline of the video content expires before completion of upconverting or right after the completion of the upconverting.

Third Exemplary Embodiment

In a third exemplary embodiment of the present invention, a plurality of processing levels are set in the upconverting. If enough time is not expected to remain to perform high-level processing (that requires a relatively long time to perform), estimated time to complete processing and playback taken at low-level processing (that requires a relatively short time to perform) is compared with a viewing deadline. A system configuration (FIG. 1) similar to that in the first exemplary embodiment is used. The configuration and a control flow according to the third exemplary embodiment alternatively can be combined with the above-described second exemplary embodiment.

The upconverting processing unit 119 according to the third exemplary embodiment can perform upconverting at two levels, for example, high-level processing and low-level processing. The high-level processing is defined as follows:

While, the high-level processing requires long time for the upconverting compared with the low-level processing, image and sound quality of the upconverting at the high-level is higher than those obtained at the low-level processing.

By manually performing the upconverting, the viewers can freely select between the high-level processing and low-level processing that are provided in advance. Control is performed so that a video content to be upconverted is automatically selected when the upconverting is performed, as in the first exemplary embodiment.

The control operation according to the third exemplary embodiment is described with reference to the flowchart illustrated in FIG. 9. In the flowchart illustrated in FIG. 9, steps S901, S902, S903, and S904 are respectively the same as (or alternatively similar to) steps S201, S202, S203, and S204 of the first exemplary embodiment as illustrated in FIG. 2.

In step S905, the system control unit 110 calculates two estimated upconverting times, in particular, an estimated upconverting processing time period B in a case where the upconverting is performed at the high-level processing, and an estimated upconverting processing time period B' in a case where the upconverting is performed at the low-level processing. The calculation is performed using the same expression as that described in the first exemplary embodiment, estimated upconverting processing time period B=(estimated average processing time period per one pixel t)×(the number of pixels in one frame of original image N)×(the number of frames f). The values of t, N, and f depend on the processing level.

Processing performed in step S906 and step S907 is respectively the same as (or alternatively similar to) that performed in step S206 and step S207 in FIG. 2 according to the first exemplary embodiment.

In step S908, the current time A and the estimated upconverting processing time period B at a high-level are added to content playback time period C of the target content. The system control unit 110 determines whether time T1 thus obtained exceeds time T that is set as a viewing deadline at current time A.

If the obtained time T1 exceeds the viewing deadline time T (YES in step S908), the processing proceeds to step S909.

On the other hand, if the time T1 does not exceed the viewing deadline time T (NO in step S908), the processing proceeds to step S910. In step S910, the system control unit 110 determines that the target content is to be upconverted at a high-level, and the processing of FIG. 9 is then terminated.

In step S909, current time A and estimated upconverting processing time period B' at a low-level are added to content playback time period C of the target content. The system control unit 110 determines whether time T1' thus obtained exceeds the time T that is set as the viewing deadline at current time A. As described above, the low-level upconverting can be performed in a shorter time period than the high-level upconverting. Accordingly, even if the video content cannot be processed by the viewing deadline in the high-level upconverting, in the low-level upconverting, the processing may be completed by the viewing deadline. Accordingly, in step S909, the system control unit 110 determines whether the low-level upconverting can be performed to the target content that is determined not processible in the high-level upconverting.

If the obtained time T1' does not exceed the viewing deadline time T (NO in step S909), the processing proceeds to step S910. In step S910, the system control unit 110 determines that the target content is low-level upconverting target content, and the processing of FIG. 9 is then terminated.

If the obtained time T1' exceeds the viewing deadline time T (YES in step S909), the system control unit 110 determines not to perform the upconverting to the target content. Then, the processing returns to step S902, and the system control unit 110 searches for unprocessed video content and repeats another iteration of the above-described processing.

As described above, in the third exemplary embodiment, when the video content to be upconverted is determined, the estimated processing time period of the upconverting is calculated. The time is obtained by adding the current time and the content playback time period to the estimated processing time period. Then, the obtained time is compared to the viewing deadline information of the video content, and the video content is determined as the upconverting target if by estimate there is enough time to both upconvert and watch the upconverted content if the upconverting is performed. Accordingly, the viewers can avoid inconvenience that the viewing deadline of the video content expires before completion of upconverting or right after the completion of the upconverting.

Further, in the third exemplary embodiment, even if the upconverting is performed at a plurality of processing levels, whether to perform the upconverting is determined according to each processing level. Accordingly, it is possible to perform appropriate upconverting according to the content and time up to the viewing deadline.

Numerous embodiments of the present invention can be implemented in a wide variety of manners. For example, the present invention can be implemented by providing a storage medium (recording medium) in which software implementing the functions of the above-described exemplary embodiments is recorded to a system or an apparatus and a computer (central processing unit (CPU) or micro processing unit (MPU)) in (or alternatively used by) the system or the apparatus executes the software. Then, the CPU or MPU executes the software read out from the storage medium to implement the functions of the above-described exemplary embodiments. A storage medium storing the software constitutes an embodiment of the present invention.

Further, the function according to the exemplary embodiments described above can be implemented based on an instruction according to the software by an operating system (OS) and the like running on the computer executing a part or the whole of the actual processing.

Moreover, in another aspect of an exemplary embodiment of the present invention, the software is written on a memory which is provided in a function enhancing card inserted in the computer or in a function enhancing unit connected to the computer. Then, based on an instruction according to the software, the function enhancing card, the CPU provided in the function enhancing unit or the like executes a part or the whole of the actual processing, and thus, the function of the above described embodiments are realized.

Software corresponding to any of the processes described or illustrated in this patent application stored in a storage medium readable by a machine that can execute the software is an embodiment of the present invention.

As described above, according to the video recording and reproducing apparatus and the control method according to the exemplary embodiments of the present invention, the viewer can avoid inconvenience that a viewing deadline of video content expires before completion of upconverting or right after the completion of the upconverting.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-021421 filed on Jan. 31, 2007 which is hereby incorporated by reference herein in its entirety.

What is claimed is:

1. A video recording and reproducing apparatus configured to acquire video content data and record the data in a non-transitory storage unit and to play back video based on the video content data recorded in the non-transitory storage unit, the video recording and reproducing apparatus comprising:
    an upconverting processing unit configured to perform upconversion of the video content data recorded in the non-transitory storage unit into a high quality image by taking more time than actual time of the video content;
    an estimation unit configured to estimate a time period required for the upconversion of the video content data;
    an acquisition unit configured to acquire viewing deadline information that indicates a viewing deadline of the video content data and to acquire playback time period information that indicates a time period required to play back the video content data;
    a control unit configured to determine whether the upconverting of the video content data is to be performed based on the time period estimated by the estimation unit, the viewing deadline information, and the playback time period,
    wherein the upconverting processing unit upconverts the video content data which is determined to be upconverted by the control unit; and
    a central processing unit configured to implement at least one of the upconverting processing unit, the estimation unit, the acquisition unit, and the control unit.

2. The video recording and reproducing apparatus according to claim 1, wherein the upconverting processing unit is configured to perform upconverting at a plurality of quality levels, each quality level having different processing time period:
    the estimation unit estimates a time period required to upconvert the video content data for each of the quality levels; and
    the control unit determines at which quality level the upconverting of the video content data is to be performed based on at least one of the time periods estimated by the estimation unit.

3. The video recording and reproducing apparatus according to claim 1, wherein the control unit determines whether the upconverting of the video content data is to be performed by comparing the viewing deadline information with a time period obtained by adding the estimated time period and the playback time period to the current time.

4. The video recording and reproducing apparatus according to claim 3, wherein the control unit further adds predetermined grace time period to the added time period, and compares the time period thereby obtained with the viewing deadline information.

5. The video recording and reproducing apparatus according to claim 1, wherein the viewing deadline information is information about an updating time for updating the video content data, and
    the acquisition unit acquires the information about the updating time based on update history of the video content data.

6. A method of controlling a video recording and reproducing apparatus that acquires video content data and records the data in a non-transitory storage unit and plays back video based on the video content data recorded in the non-transitory storage unit, the method comprising:

performing upconversion of the video content data recorded in the non-transitory storage unit into a high quality image by taking more time than actual time of the video content;

estimating a time period required for the upconverting of the video content data;

acquiring viewing deadline information that indicates a viewing deadline of the video content data;

acquiring playback time period information that indicates a time period required to play back the video content data; and determining whether the upconverting of the video content data is to be performed based on the estimated time period, the viewing deadline information, and the playback time period, wherein while performing the upconversion, the video content data which is determined to be upconverted is upconverted.

7. The control method according to claim 6, further comprising:

estimating a time period required to upconvert the video content data for each of a plurality of quality levels; and determining at which quality level the upconverting of the video content data is to be performed based on at least one of the estimated time periods.

8. The control method according to claim 6, further comprising determining whether the upconverting of the video content data is to be performed by comparing the viewing deadline information with a time period obtained by adding the estimated time period and the playback time period to current time.

9. The control method according to claim 8, further comprising adding a predetermined grace time period to the added time period, and comparing the time period obtained as a result of the addition with the viewing deadline information.

10. The control method according to claim 6, wherein the viewing deadline information is information about an updating time for updating the video content data, and wherein the method further comprises acquiring the information about the updating time based on an update history of the video content data.

* * * * *